United States Patent [19]

Kondo et al.

[11] Patent Number: 5,075,171

[45] Date of Patent: Dec. 24, 1991

[54] CONDUCTIVE FILM AND METHOD FOR PREPARING SAME

[75] Inventors: Syunichi Kondo; Syu Watarai, both of Minami-ashigara, Japan

[73] Assignee: Fuji Photo Film Co., Ltd., Kanagawa, Japan

[21] Appl. No.: 675,069

[22] Filed: Mar. 26, 1991

Related U.S. Application Data

[63] Continuation of Ser. No. 242,465, Sep. 9, 1988, abandoned.

[30] Foreign Application Priority Data

Sep. 10, 1987 [JP] Japan .............................. 62-227144
Dec. 1, 1987 [JP] Japan .............................. 62-304090
Dec. 1, 1987 [JP] Japan .............................. 62-304091
Dec. 1, 1987 [JP] Japan .............................. 62-304092

[51] Int. Cl.$^5$ .......................... B32B 9/00; B32B 9/04
[52] U.S. Cl. .............................. 428/411.1; 428/473.5; 428/474.4; 428/482; 428/515; 428/696

[58] Field of Search ............. 428/411.1, 473.5, 474.4, 428/482, 515, 696

[56] References Cited

U.S. PATENT DOCUMENTS 3,501,301  3/1970  Nadeau et al. ............... 430/954 X
3,597,272  8/1971  Gramza et al. ............... 117/218

Primary Examiner—George F. Lesmes
Assistant Examiner—Terrel Morris
Attorney, Agent, or Firm—Sughrue, Mion, Zinn, Macpeak & Seas

[57] ABSTRACT

There is provided a conductive film and a method for preparing same. The conductive film is prepared by forming a prime-coating layer of a three-dimensional network structure on a base and by applying a semiconductive compound-containing solution onto the prime-coating layer to form a conductive layer. The conductive film is excellent in conductivity and transparency as well as adhesion of the conductive layer.

9 Claims, 1 Drawing Sheet

CONDUCTIVE FILM AND METHOD FOR PREPARING SAME

This is a continuation of application Ser. No. 07/242,465 filed Sept. 9, 1988, now abandoned.

BACKGROUND OF THE INVENTION (1) Field of the Invention

This invention relates to a conductive film including a conductive coating layer and a method for producing the same.

(2) Description of the Prior Art

Conductive film, inter alia, transparent conductive film is widely used as, for example, a base material for electrophotographic recordings, a base material for electrostatic photographic recordings, transparent electrodes for thin liquid crystal displays, transparent electrodes for distributed electroluminescence displays, transparent electrodes for touch panels, clean rooms, meter windows, antistatic film for VTR tape, transparent heaters, and the like.

Conventionally used transparent conductive films are various kinds of semiconductor film-type conductive films that include ITO (Indium Tin Oxide) film, tin oxide film doped with antimony, CTO (Cadmium Tin Oxide) film, copper iodide film, titanium oxide film, zirconium oxide film, and the like. Of such semiconductor film-type conductive films, ITO film exhibits the most excellent transparency and conductivity. The formation of tin oxide film requires that the base be heated to a high temperature, resulting in its not being usable for polymeric film. CTO film has a small energy gap or an absorption edge on the long wavelength side compared with ITO film, and it is yellowish with an increased thickness. Copper iodide film, titanium oxide film, and zirconium oxide film are inferior in transparency and conductivity to such films.

The semiconductor film-type conductive films are generally prepared by vapor deposition and the like. Unfortunately this requires large-scale facilities, resulting in a significant increase in the manufacturing cost.

A method for manufacturing such a semiconductor film at a low cost is proposed which comprises the steps of previously subjecting a polymeric film base to a prime-coating treatment to form a prime-coating layer and causing a surface of the so-formed prime-coating layer to absorb a semiconductive compound, resulting in the formation of a transparent conductive film while improving adhesion of a conductive layer to the base and upper layer, as disclosed in JP-B No. 9984/1973. (The term "JP-B" means an examined Japanese patent publication.)

The conventional prime-coating described above was carried out using a swellable and electrically-insulating polymeric material exhibiting adhesion to a base. Unfortunately, this failed to cause the prepared transparent conductive film to exhibit satisfactory conductivity, although it was improved in adhesion and transparency.

BRIEF SUMMARY OF THE INVENTION

Accordingly, it is a general object of the present invention to provide conductive film which is excellent in adhesion of a conductive layer and capable of exhibiting high conductivity.

It is still more specific object of the present invention to provide a transparent conductive film which is excellent in transparency, adhesion of a conductive layer and capable of exhibiting high conductivity.

It is another object of the present invention to provide a method for the preparation of a conductive film which is excellent in adhesion of a conductive layer and capable of exhibiting high conductivity.

The above and other objects, features, and advantages of the invention will become apparent in the following detailed description and drawings.

DETAILED DESCRIPTION OF THE INVENTION

Figure 1:
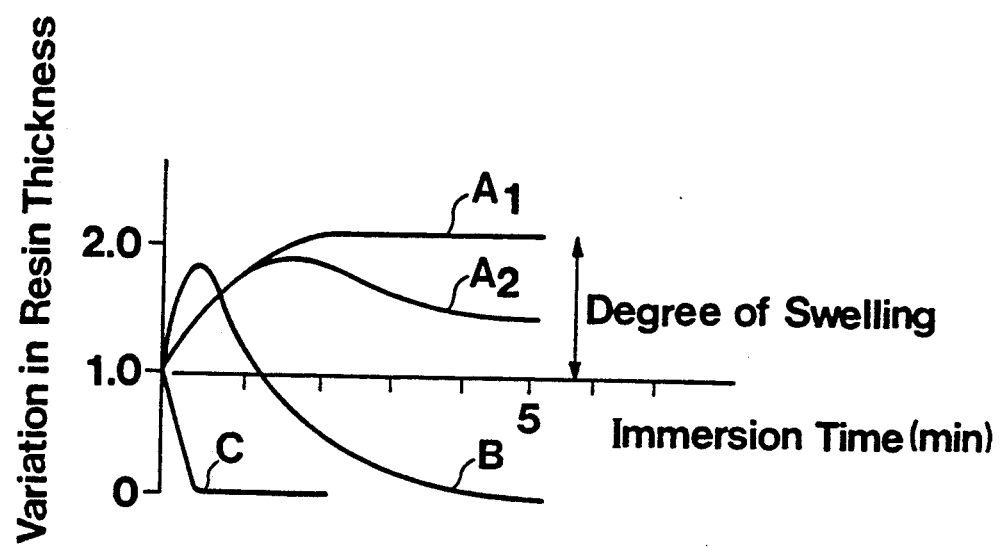
FIG. 1 is a graphic representation showing a variation in thickness of the resin obtained when the resin is immersed in a solvent.

The inventors made efforts to eliminate the above-described disadvantages of conventional transparent conductive film, and as a result they have made the present invention through taking notice that the formation of a layer of a three-dimensional network structure as a prime-coating layer causes swelling of the prime-coating layer due to a solvent of a semiconductive compound solution to be controlled within a predetermined range, so that the semiconductive compound may tend to form a conductive layer that is present in the prime-coating layer near an opposite surface of a base at the highest concentration.

The present invention is to provide a transparent conductive film prepared by forming a prime-coating layer of a three-dimensional network structure on a base and by applying a semiconductive compound-containing solution onto the prime-coating layer to form a conductive layer.

In the present invention the base may be made of any suitable material known in the art, which includes polyesters, such as polyethylene terephthalate and the like; polyolefins, such as polyethylene, polypropylene, and the like; celluloses, such as cellulose acetate and the like; polymethyl methacrylates; polyamides, such as nylon 6 and the like; polyimides; polycarbonates; polyvinyl alcohols; vinyl chloride-vinyl acetate copolymers; glass; and papers coated with polyolefins or polyesters.

In the present invention, as described above, the prime-coating layer of a three-dimensional network structure is formed on the base. The term "three-dimensional network structure" used in this specification and the claims indicates a structure obtained by the formation of chemical bonding (crosslinking) between specific atoms in a linear polymer. The formation of such a three-dimensional network structure conveniently takes place after the application of a polymer latex because a polymer having the three-dimensional network structure is generally insoluble in a solvent. More specifically, the formation may be carried out by a suitable means such as the use of a crosslinking agent, photo-crosslinking using a photopolymer, crosslinking due to polymerization after the addition of a polymerizable compound, and the like. The crosslinking may be practiced using heat, visible rays, radiation, ultraviolet rays, electron rays, or the like.

For example, the crosslinking may be formed by the oxidation of natural or synthetic rubber or unsaturated resin, such as unsaturated polyester resin or alkyl resin. The material may be crosslinked using a polymerization initiator in the presence of an unsaturated monomer or by exposure to light or heat. Also, epoxy resin or epoxy group-containing resin, such as acrylic resin containing an epoxy group, may be crosslinked using a material such as polyamine, polyamide, anhydrous polycarboxylic acid, or the like. Further, the crosslinking may take place by a reaction of resin containing a hydroxyl group, a carboxyl group, an amino group, or the like, with polyisocyanate. Alternatively, it may be formed by a reaction of polyamine with organic acid or anhydrous acid. However, the method for the crosslinking is not limited to the foregoing.

Various compounds may be used for the formation of the three-dimensional network structure. For example, compounds mentioned in "CROSSLINKING AGENT HANDBOOK", Taiseisha (Japan), 1981, may be used for this purpose.

In accordance with one preferred embodiment of the present invention, the conductive layer is formed by applying moisture-curing type urethane resin onto the base and curing it to form the prime-coating layer, and then applying the semiconductive compound-containing solution onto the so-formed prime-coating layer.

Also, in accordance with another preferred embodiment of the present invention, the conductive layer is formed by applying a composition comprising of an isocyanate compound and an active hydrogen compound onto the base and curing it to form the prime-coating layer, and then applying the semiconductive compound containing solution onto the prime-coating layer.

In addition, in accordance with a further preferred embodiment of the present invention, the conductive layer is formed by forming a cured epoxy resin layer acting as the prime-coating layer on the base and applying the semiconductive compound-containing solution onto the prime-coating layer.

The moisture-curing type urethane resin used in the present invention is one-pack curable urethane resin, which is adapted to absorb moisture contained in air to cause the crosslinking reaction to be carried out three-dimensionally, resulting in its being cured. In general, such a moisture-curing type urethane resin has a free isocyanate group formed at its end by reacting polyhydric alcohol with excessive diisoyanate, and by being reacted with moisture to cause curing of the resin. When non-yellowing diisocyanate is used, a catalyst, such as dibutyltin dilaurate or the like, may often be used as a reaction promotor.

The polyhydric alcohol suitable for use in the present invention includes ethylene glycol, propylene glycol, 1,3-butylene glycol, 1,6-hexanediol, diethylene glycol, dipropylene glycol, neopentyl glycol, triethylene glycol, hydrogenated bisphenol A, bisphenol dihydroxypropyl ether, glycerin, triemthylol ethane, trimethylol propane, tris-hydroxymethylamino methane, pentaerythritol, dipentaerythritol, and the like. The diisocyanate used herein includes 2,4-tolylenediisocyanate, 2,6-tolylenediisocyanate, 4,4'-diphenylmethane diisocyanate, paraxylylene diisocyanate, metaxylylene diisocyanate, hexamethylene diisocyanate, lysine diisocyanate, 4,4'-methylene bis(cyclohexyl isocyanate), methylcyclohexane-2,4-diisocyanate, methylcyclohexane-2,6-diisocyanate, 1,3-(isocyanatemethyl) cyclohexane, isophorone diisocyanate, trimethylhexamethylene diisocyanate, dimer acid diisocyanate, and the like. Also, triphenylmethane triisocyanate, naphthylene-1,5-diisocyanate, polymethylenepolyphenyl isocyanate, and the like may be used as the moisture-curing type urethane resin in the present invention. Further, the urethane resins include blocked-type isocyanates that are blocked with phenols, such as phenol and cresol, and alcohols. However, the moisture-curing type urethane resins suitable for use in the present invention is not limited to the foregoing.

The above-described resins for the moisture-curing type urethane resins each may be used alone. Alternatively, the resins each may be used in combination with a compound containing a reactive group, such as a hydroxyl group, a carboxyl group, an amino group, or the like. The reactive group-containing compound includes, for example, 1,4-butanediol, ethylene glycol, polyether polyol, polyester-type polyol, acrylic-type polyol, epoxy resin-type polyol, 4,4-methylene-bis-(2-chloroaniline), hydroxypropylated ethylenediamine, and the like.

The prime-coating layer may be formed of two-pack type urethane resin by applying the composition containing the isocyanate compound and active hydrogen compound onto the base. Such a composition for the two-pack urethane resin is per se known in the art and may include various kinds of compounds. For example, compounds disclosed in CROSSLINKING AGENT HANDBOOK, described above, may be used for this purpose.

The isocyanate compound includes dimers of triphenylmethane triisocyanate, diphenylmethane diisocyanate, toluylene diisocyanate and 2,4-toluylene diisocyanate; polyisocyanate-type compounds, such as naphthylene-1,5-diisocyanate, o-toluylene diisocyanate, polymethylenepolyphenyl isocyanate, hexamethylene diisocyanate, and the like; and polyisocyanate adduct-type compounds, such as an adduct of tolylene diisocyanate with trimethylolpropane, all adduct of hexamethylene diisocyanate with water, an adduct of xylylene diisocyanate with trimethylolpropane, and the like. However, the isocyanate compound is not limited to the foregoing.

The active hydrogen compound may include, for example, compounds containing a hydroxyl group, a carboxyl group, an amino group, an amide group, and the like. More specifically, the compound includes, for example, 1,4-butanediol, ethylene glycol, glycerin, polyether-type polyol, polyester-type polyol, acrylic-type polyol, epoxy resin-type polyol, 4,4-methylene-bis-(2-chloroaniline), hydroxypropylated ethylenediamine, and the like. Nevertheless, the active hydrogen compound is not limited to the foregoing.

In addition to the above-described two-pack type isocyanate compounds, blocked-type isocyanates, which are blocked with phenols, such as phenol and cresol, and alcohols, may be used.

The isocyanate compound and active hydrogen compound are used at a weight ratio of 1:99 to 99:1, preferably 5:95 to 95:5.

The epoxy resin used in the present invention includes, for example, epoxy group-containing acrylic resin and the like, as well as conventional epoxy resin.

In general, epoxy resin is prepared by a reaction between diol and epichlorohydrin. Commercially-available epoxy resin generally uses bisphenol A as the diol.

More specifically, commercially-available epoxy resins used as the epoxy resin in the present invention include EPON-812, -815, -820, -828, -834, -836, -1001, -1002, -1004, -1007, -1009 and -1031 (trade names, manufactured by Shell): Araldite .52, -260, -280, -502, -6005, -6071, -6700, -6084, -6097 and -6099 (trade names, manufactured by Ciba-Geigy); Dow-331, -332, -661, -664 and -667 (trade names, manufactured by Dow Chemical Corp.); Bakelite-2774, -2795, -2002, -2053, -2003 and -3794 (trade names, manufactured by Bakelite); Epoxide-201 (trade names, manufactured by Union Carbide); and the like. However, the epoxy resin used in the present invention is not limited to the foregoing.

A curing agent for the epoxy resin which may be used in the present invention includes various kinds of compounds such as, for example, compounds mentioned in CROSSLINKING AGENT HANDBOOK, described above. The compounds include, for example, aliphatic polyamines, such as diethylene triamine, triethylene tetramine, and tetraethylene pentamine; modified aliphatic polyamines, such as A.E.R. Hardner H-L-0110 (trade names, manufactured by Asahi Chemical Industry Co., Ltd. (Japan)), and Adeka Hardner EH-220, -230, -240 and -210 (trade names, manufactured by Asahi Electro-Chemical Co., Ltd. (Japan)); alicyclic polyamines, such as 3,3'-dimethyl-4,4'-diaminodicyclohexyl methane and isophoron diamine; modified alicyclic polyamines, such as MEKMEX H-70 and -75 (trade names, manufactured by Nippon Synthetic Chemical Industry Co., Ltd. (Japan)); aromatic polyamines, such as 4,4'-diaminodiphenyl methane and m-phenylenediamine; modified aromatic polyamines, such as Adeka Hardner EH-521 and -541 (trade names, manufactured by Asahi Electro-Chemical Co., Ltd. (Japan)); polyaminde amines, such as Sumicure-P-700 and P-715 (trade names, manufactured by Sumitomo Chemical Co., Ltd. (Japan)); modified polyamides, such as TOMIDE #210 and #215 (trade names, manufactured by Fuji Kasei): acids, such as maleic acid, dodecenylsuccinic acid, phthalic acid, and their anhydrites; urea-melamineformaldehyde condensates; dicyandiamide and its derivatives; boron trifluoride complexes, such as a boron trifluoride-monoethylamine complex; organometallic compounds; polythiols, such as TOMIDE ZS-2 (trade names, manufactured by Fuji Kasei); phenol and its derivatives; isocyanate compounds, such as Colonate-L and -Hl (trade names, manufactured by Nippon Polyurethane Co., Ltd. (Japan)); isocyanates blocked with alcohols, phenols, and the like; and ketimine, tertiary amine imidazole, and their derivatives. However, the curing agent is not limited to the foregoing.

The epoxy resin and curing agent may be used at a weight ratio of 1:99 to 99:1, preferably 5:95 to 95:5.

The prime-coating layer may contain, in addition to the above-described compound necessary to form the three-dimensional network structure, resin exhibiting good compatibility with the compound. The resin includes, for example, styrene-butadiene copolymer, styrene resin, alkyd resin, vinyl chloride resin, vinyl chloride-vinyl acetate resin, polyvinylidene chloride resin, vinyl acetate resin, polyvinyl acetal, polyacrylic ester, polymethacrylic ester, isobutylene polymer, polyester, ketone resin, polyamides, polycarbonates, polythiocarbonates, copolymers of vinyl haloallylates, vinyl acetate, and the like. However, the resin is not limited to the foregoing.

The prime-coating layer may be formed into a thickness of 0.01–100 $\mu$m, preferably 0.05 to 10 $\mu$m, although it is not limited to such a thickness.

The prime-coating layer formed of the resin having such a three-dimensional network structure is required to have solvent-swellability but not to substantially cause it to dissolve in a solvent of the semiconductive compound-containing solution, although it swells during application of the solution. Now this will be described with reference to FIG. 1, which is a graphic representation showing relationships between the time of immersion of a sample of a resin into a solvent and the variation in thickness of the resin, wherein $A_1$ indicates a sample that is swollen by the solvent but has a constant thickness after the lapse of a predetermined time, $A_2$ indicates a sample that does not cause a decrease in initial thickness, although it is partially dissolved in the solvent after being swollen, B indicates a sample that is dissolved in the solvent after being swollen, and C indicates a sample that is dissolved in the solvent from the start.

The resin used in the present invention belongs to the $A_1$ or $A_2$ type, of which the degree of swelling $T_1/T_0$ is preferably within the range of 1.05 to 2.5, more preferably within the range of 1.05 to 1.7, when $T_0$ is about 10 $\mu$m, wherein $T_0$ is the thickness of resin before immersion, $T_1$ is the thickness of resin after immersion into the solvent of the semiconductive compound solution for five minutes. When the degree of swelling is excessively low, the semiconductive compound exhibits poor resistance to marring because it is formed on the surface of the prime-coating layer. Also, this has another disadvantage of causing the semiconductive compound to form large crystals over time, resulting in white turbidity. On the contrary, the degree of swelling is excessively high or the polymer is soluble as indicated at B or C, and the semiconductive compound is distributed throughout the prime-coating layer to lead to a decrease in conductivity.

A preferred method of the present invention for preparing the conductive layer comprises the steps of applying the solution comprising the volatile solvent and the semiconductive compound dissolved in the solvent onto the prime-coating layer of the two-pack type polyurethane resin formed and cured on the base, to cause the solution to be absorbed in the prime-coating layer, and then vaporizing the solvent.

The semiconductive compound used for the conductive layer of the conductive film of the present invention preferably includes cuprous iodide and silver iodide. However, it may include metal-containing semiconductive compounds, such as, for example, another cuprous halide; silver halide; halides of bismuth, gold, indium, iridium, lead, nickel, palladium, rhenium, tin, tellurium and tungsten; cuprous thiocyanate, copper thiocyanate and silver thiocyanate; mercury iodide, and the like.

The metal-containing semiconductive compound is not easily soluble in water or essentially all volatile solvents, such as an organic solvent. Accordingly, as a solubilizing agent for the semiconductive compound may be used a compound that forms a soluble complex with the semiconductive compound.

In general, alkaline metal halide and ammonium halide are used as a complex-forming agent that forms a complex compound with semiconductive metal halides, such as silver halide, cuprous halide, stannous halide, lead halide, or the like. The formed complex compound is easily soluble in ketone. Normally the complex compound is preferably washed with water to remove the solubilizing agent therefrom. It was found that the formed complex compound per se often provides satisfactory conductivity. In this instance the complex compound per se constitutes the semiconductive compound. Volatile ketone solvents suitable for dissolving the complex compound include, for example, acetone, methyl ethyl ketone, 2-pentanone, 3-pentanone, 2-hexane, 2-heptane, 4-heptanone, methyl isopropyl ketone, ethyl isopropyl ketone, diisopropyl ketone, methyl isobutyl ketone, methyl-t-butyl ketone, diacetyl, acetylacetone, acetonylacetone diacetone alcohol, mesityl oxide, chloroacetone, cyclopentanone, cyclohexanone, and acetophenone. Also, any mixture of ketones may be used. Alternatively the ketones each may be used alone. In some cases, and particularly when lithium iodide or sodium iodide is used as the complex-forming agent, a certain solvent other than the ketone may be used for dissolving an iodide complex compound. Solvents suitable for use for this purpose includes methyl acetate, ethyl acetate, n-propyl acetate, isopropyl acetate, n-butyl acetate, isoamyl acetate, tetrahydrofuran, dimethylformamide, methyl cellosolve, methyl cellosolve acetate, ethyl acetate, and the like.

Acetonitrile may be used as a solvent for cuprous iodide, because it forms a complex compound with cuprous iodide.

The semiconductive compound is preferably used in the form of a solution at a concentration of 0.1 to 50 wt %. Also, the solution is applied at an amount of preferably 40 to 2000 mg/m$^2$, more preferably 100 to 1000 mg/m$^2$, in terms of the amount of the semiconductive compound.

The transparent conductive film of the present invention, as described above, is prepared by forming the prime-coating layer of a three-dimensional network structure on the base and applying the semiconductive compound solution onto the prime-coating layer to cause the layer to absorb the solution, resulting in the formation of the conductive layer. The time for curing the prime-coating layer is not limited to a specific range. Also, it varies depending on the curing temperature.

Application of the solution onto the prime-coating layer may be carried out according to a suitable method, such as a rotation method, an immersion method, a spraying method, a beading method using a continuous applicator, a continuously-moved wicking method, a method using a hopper, and the like, although it is not limited to such exemplified methods.

Such formation of the conductive layer per se may be carried out according to a procedure given in JP-B No. 9984/1973 or 34499/1971.

As can be seen from the foregoing, the conductive film of the present invention is excellent in transparency and exhibits satisfactory adhesion of the conductive layer. In particular, it exhibits high conductivity. Thus, it will be noted that the transparent conductive film of the present invention can be extensively used as a base material for electrophotographic recordings, as a base material for electrostatic-photographic recordings, transparent electrodes for a thin liquid crystal displays, transparent electrodes for distributed electroluminescence displays, transparent electrodes for touch panels, clean rooms, meter windows, as antistatic film for VTR tape, transparent heaters, and the like.

The present invention will now be described in detail below with reference to Examples.

COMPARATIVE EXAMPLE 1 AND EXAMPLE 1

A solution containing 5 g of Polyester Adhesive 49000 (trade name, manufactured by E.I. Du Pont De Nemours & Co., Inc.) in 95.0 g of methyl ethyl ketone was applied onto a polyethylene terephthalate film having a thickness of 100 μm using an extrusion hopper, and it was dried at 100° C. to obtain a prime-coated base for comparison. The thickness of prime-coating layer was about 0.3 μm.

A mixture of 2.5 g of Polyester Adhesive 49000, 2.5 g of a polyisocyanate crosslinking agent of trade name Colonate L, manufactured by Nippon Polyurethane Co., Ltd. (Japan), and 95.0 g of methyl ethyl ketone was applied in the same manner as for the prime-coating layer of a base for comparison. The prime-coating layer thickness was about 0.3 μm. These layers were allowed to stand for two days at 50° C. and 80% RH for curing.

A solution containing 3 g of cuprous iodide in 97 g of acetonitrile was applied onto each of the prime-coating layers in an amount of 0.3 g/m$^2$ in terms of dry weight, and it was dried at 100° C. to form a transparent conductive film. The solution contained no binders, but could be absorbed into the prime-coating layer to form a fine-particle layer of CuI, predominantly in the upper part of the prime-coating layer.

When the surface resistance of these conductive films was measured using a Loresta MCP-TESTER (manufactured by Mitsubishi Petrochemical Co., Ltd. (Japan), it was found that the conductive film of Comparative Example 1 had a surface resistance of $5.0 \times 10^9 \Omega/\square$, and the conductive film of Example 1 according to the present invention had a surface resistance of $1.0 \times 10^4 \Omega/\square$. Then the prime-coating layers for comparison and according to the present invention were further formed to have a film thickness of 10 μm, by adjusting the concentration of the solvent. The degree of swelling of the layer in acetonitrile was examined by the method described herein above. The prime-coating layer for comparison was of B-type. The prime-coating layer according to the present invention was of A-type, and the degree of swelling was 1.4.

The results of the conductivity and the swelling in acetonitrile suggest that the distribution of the CuI particles is dense in the upper part of the prime-coating layer because the prime-coating layer has a network structure due to the curing, and the network structure causes the swelling of the prime-coating layer with the cuprous iodide solution to lower.

To examine the distribution of the CuI particles, the conductive films of Comparative Example 1 and Example 1 were cut to a thickness of 20 μm, and cross sections thereof were enlarged 500,000 times using a transmission-type electron microscope for observation. In the film of Comparative Example 1 it was confirmed that although relatively many CuI particles were present in the upper part of the prime-coating layer, they were distributed throughout the layer. On the other hand, in the film of Example 1 it was confirmed that CuI particles were present densely only in the upper part of the prime-coating layer.

EXAMPLE 2 TO 4

Instead of the 2.5 g of Polyester Adhesive 49000 and 2.5 g of Colonate L stated in Example 1, Polyester Adhesive 49000 and Colonate L in amounts as shown in Table 1 were applied onto polyester films having a thickness of 100 μm, to prepare three kinds of prime-coated base in the same manner as for the prime-coating layer for Example 1. Each of the prime-coating layers had a thickness of about 0.3 μm. The layers were allowed to stand at 50° C. and 80% RH for two days for curing.

A solution containing 3 g of cuprous iodide in 97 g of acetonitrile was applied onto each of the thus-prepared three prime-coating layers in an amount of 0.3 g/m$^2$ in terms of dry weight, and it was dried at 100° C. to form a transparent conductive film.

The surface resistance of the thus-prepared conductive films was measured using a Loresta MCP-TESTER, and the results are given in Table 1. Each of them showed good conductivity.

TABLE 1

|  | Adhesive 4900 | Colonate L | Surface resistance ($\Omega/\square$) | Type of thickness variation-curve of prime-coating layer in $CH_3CN$ | Degree of Swelling |
|---|---|---|---|---|---|
| Example 2 | 4.20 g | 0.80 g | $2.5 \times 10^5$ | A type | 1.7 |
| Example 3 | 3.40 g | 1.60 g | $5.0 \times 10^4$ | A type | 1.5 |
| Example 4 | 0 g | 5.00 g | $1.0 \times 10^4$ | A type | 1.1 |

EXAMPLE 5

A solution containing 5.0 g of a moisture-curing type urethane resin comprising trimethylolpropane adduct of tolylene diisocyanate in 95.0 g of dichloromethane was applied onto a polyethylene terephthalate film having a thickness of 100 μm using an extrusion hopper, and it was dried at 100° C. The thickness of the thus-formed prime-coating layer was about 0.5 μm. The layer was allowed to stand at 50° C. and 80% RH for one day for curing. Thereafter, a solution containing 3 g of cuprous iodide in 97 g of acetonitrile was applied onto the prime-coating layer in an amount of 0.3 g/m² in terms of dry weight, and it was dried at 100° C. to form a transparent conductive film. The solution contained no binders, but was absorbed into the prime-coating layer to form a fine-particle layer of CuI, predominantly in the upper part of the layer. The surface resistance of the conductive film was measured using a Loresta MCP-TESTER, and it was found to be $1.0 \times 10^4 \Omega/\square$.

EXAMPLE 6

A solution containing 4.0 g of a moisture-curing type urethane resin of trade name Colonate L, manufactured by Nippon Polyurethane Co., Ltd. (Japan), and 3.0 g of a polyester resin of trade name Polyester Adhesive 49000, manufactured by E.I. Du Pont de Nemours & Co., Inc., in 93.0 g of dichloromethane was applied onto a polyethylene terephthalate film having a thickness of 100 μm using an extrusion hopper, and it was dried at 100° C. The thickness of the thus-formed prime-coating layer was about 0.3 μm. The layer was allowed to stand at 50° C. and 80% RH for two days for curing. A solution containing 3 g of cuprous iodide in 97 g of acetonitrile was applied onto the prime-coating layer in an amount of 0.3 g/m² in terms of dry weight, and it was dried at 100° C. to form a transparent conductive film. The surface resistance of the conductive film was $1.0 \times 10^4 \Omega/\square$.

EXAMPLE 7

Example 6 was repeated, except that instead of 0.3 g of Polyester Adhesive 49000, polymers shown in Table 2 were used. Each of the obtained conductive films was transparent and showed good conductivity.

TABLE 2

| Polymer | | Surface resistance ($\Omega/\square$) |
|---|---|---|
| Polyester resin of trade name Bylon 200, manufactured by Toyobo Co., Ltd. (Japan) | 3.0 g | $1.0 \times 10^4$ |
| Vinyl acetate resin of trade name MPR-T30, manufactured by Nissin Chemical Co., Ltd. (Japan) | 3.0 g | $1.2 \times 10^4$ |
| Polymethyl methacrylate of trade name Dianale BR-83, manufactured by Mitsubishi Rayon Co., Ltd. (Japan) | 3.0 g | $1.5 \times 10^4$ |
| Vinylidene chloride resin of trade name F-216, manufactured by Asahi Chemical Industry Co., Ltd. (Japan) | 3.0 g | $1.0 \times 10^4$ |
| Polycarbonate resin of trade name K1300, manufactured by Teijin Chemical Co., Ltd. (Japan) | 3.0 g | $1.2 \times 10^4$ |
| Styrene resin of trade name Vicolastic A-75, manufactured by Esso Co., Ltd. (Japan) | 3.0 g | $1.2 \times 10^4$ |

EXAMPLE 8

Example 6 was repeated, except that instead of 4.0 g of Colonate L, moisture-curing type urethane resins (polyisocyanates) shown in Table 3 were used. All of the formed conductive films were transparent and showed good conductivity.

TABLE 3

| Moisture-curing type urethane resin | | Surface resistance ($\Omega/\square$) |
|---|---|---|
| Milionate MR-100 (Nippon Polyurethane Co., Ltd.) | 3 g | $1.0 \times 10^4$ |

$$\begin{array}{c} NCO \\ | \\ \phantom{x} \end{array} \quad \begin{array}{c} NCO \\ | \\ \phantom{x} \end{array} \quad \begin{array}{c} NCO \\ | \\ \phantom{x} \end{array}$$

(structure: benzene rings linked by $CH_2$ groups with NCO substituents, repeat unit n)

| Taketate D110N (Takeda Chemical Industries, Ltd.) TMD adduct of XDI | 4 g | $1.0 \times 10^4$ |
| Barnock DN-950 (Dai Nippon Ink & Chemicals, Inc.) TMP adduct of HMDI | 4 g | $4.6 \times 10^4$ |
| Barnock D-802 (Dai Nippon Ink & Chemicals, Inc.) Polymer of TDI | 6 g | $2.5 \times 10^4$ |
| Sumijule N-75S (Sumitomo-Bayer Urethane Co., Ltd.) | 4 g | $2.3 \times 10^4$ |

$$OCN(CH_2)_6-N \begin{array}{c} CONH(CH_2)_6NCO \\ \diagdown \\ CONH(CH_2)_6NCO \end{array}$$

COMPARATIVE EXAMPLE 2

A solution containing 5.0 g of Polyester Adhesive 49000 in 95.0 g of methyl ethyl ketone was applied as a prime-coating layer onto a polyethylene terephthalate film having a thickness of 100 μm using of an extrusion hopper, and it was dried at 100° C. The thickness of the thus-formed prime-coating layer was about 0.5 μm. A solution containing 3 g of cuprous iodide in 97 g of acetonitrile was applied onto the prime-coating layer in an amount of 0.3 g/m² in terms of dry weight, and it was dried at 100° C. The surface resistance of the conductive film was $5.0 \times 10^9 \Omega/\square$.

COMPARATIVE EXAMPLE 3

Instead of the prime-coating layer of Comparative Example 2, a solution containing, in 95.0 g of dichloromethane, 5.0 g of a resin prepared by copolymerizing vinylidene chloride, acrylonitrile, and acrylic acid in a weight ratio of 80:19:1 was applied using an extrusion hopper and dried at 100° C. The film thickness of the thus-formed layer was about 0.5 μm. Thereafter a conductive film was formed in the same way as in Example 5, and the surface resistance thereof was measured at $3.0 \times 10^7 \Omega/\square$.

EXAMPLE 9

In the same way as in Example 6, a prime-coating layer of 0.3 μm in thickness was formed on polyethylene terephthalate having a thickness of 100 μm. After the film was allowed to stand at 50° C. and 80% RH for two days for curing, a solution containing 776 g of silver iodide and 2.14 g of potassium iodide in 2-butane was applied thereon in an amount of 0.6 g/m² in terms of dry weight, and it was dried at 100° C. to form a transparent conductive film. The resistance of the conductive film was $3.0 \times 10^6 \Omega/\square$.

As shown in Examples 5 to 9, the conductive films wherein moisture-curing type polyurethane resins were used for a prime-coating layer exhibited good conductivity compared with the Comparative Examples 1 to 3.

EXAMPLE 10

A solution containing 5.0 g of a polyisocyanate of trade name Mirionate MR-100, manufactured by Nippon Polyurethane Co., Ltd. (Japan), 2.0 g of a polyester-type polyol of trade name Nippolan 800, manufactured by Nippon Polyurethane Co., Ltd. (Japan), and 4.0 g of trade name Polyester Adhesive 4900, manufactured by E.I. Du Pont de Nemours & Co., Inc., in 500 g of dichloromethane was applied onto a polyethylene terephthalate film having a thickness of 100 μm using an extrusion hopper, and it was dried at 100° C. The thickness of the thus-formed prime-coating layer was about 0.5 μm. The layer was allowed to stand at 50° C. for two days for curing. Thereafter a solution containing 3 g of cuprous iodide in 97 g of acetonitrile was applied onto the prime-coating layer in an amount of 0.3 g/m² in terms of dry weight, and it was dried at 100° C. to form a transparent conductive film. The solution contained no binders, but was absorbed into the prime-coating layer to form a fine-particle layer of CuI, predominantly in the upper part of the layer. The surface resistance of the conductive film was measured using a Loresta MCP-TESTER and it was $8.1 \times 10^3 \Omega/\square$.

EXAMPLE 11

Example 10 was repeated, except that instead of 5.0 g of Mirionate MR-100 and 2.0 g of Nippolan 800, isocyanate compounds and polyester-type polyols described in Table 4 were used. The surface resistance of each of the thus-formed transparent conductive films is given in Table 4. They showed good conductivity.

TABLE 4

| Isocyanato Compound | | Polyester-type Polyol | | Surface resistance (Ω/□) |
|---|---|---|---|---|
| Colonate L (Nippon Polyurethane Co., Ltd.) | 4.0 g | Nippolan 800 (Nippon Polyurethane Co., Ltd.) | 2.0 g | $1.6 \times 10^4$ |
| Mirionate MT (Nippon Polyurethane Co., Ltd.) | 4.0 g | Nippolan 800 (Nippon Polyurethane Co., Ltd.) | 2.0 g | $1.5 \times 10^4$ |
| Barnock D-750 (Dai Nippon Ink & Chemicals, Inc.) | 5.0 g | Nippolan 800 (Nippon Polyurethane Co., Ltd.) | 2.0 g | $1.6 \times 10^4$ |
| Taketate D110N (Takeda Chemical Industries, Ltd.) | 5.0 g | Nippolan 800 (Nippon Polyurethane Co., Ltd.) | 2.0 g | $1.3 \times 10^4$ |
| Barnock D-802 (Dai Nippon Ink & Chemicals, Inc.) | 8.0 g | Nippolan 800 (Nippon Polyurethane Co., Ltd.) | 2.0 g | $2.5 \times 10^4$ |
| Barnock D-950 (Dai Nippon Ink & Chemicals, Inc.) | 5.0 g | Nippolan 800 (Nippon Polyurethane Co., Ltd.) | 2.0 g | $2.0 \times 10^4$ |
| Mirionate MR-100 (Nippon Polyurethane Co., Ltd.) | 4.0 g | Nippolan 121 (Nippon Polyurethane Co., Ltd.) | 3.0 g | $8.2 \times 10^4$ |
| Mirionate MR-100 (Nippon Polyurethane Co., Ltd.) | 4.0 g | Takelac U-25 (Takeda Chemical Industries, Ltd.) | 2.7 g | $3.0 \times 10^4$ |
| Mirionate MR-100 (Nippon Polyurethane Co., Ltd.) | 4.0 g | Takelac U-53 (Takeda Chemical Industries, Ltd.) | 2.0 g | $3.0 \times 10^4$ |
| Mirionate MR-100 (Nippon Polyurethane Co., Ltd.) | 4.0 g | Nippolan 1100 (Nippon Polyurethane Co., Ltd.) | 2.0 g | $3.0 \times 10^4$ |

EXAMPLE 12

A solution containing 5.0 g of a blocked-type polyisocyanato of trade name Desmodule AP Stable, manufactured by Sumitomo-Bayer Co., Ltd., 3.0 g of Nippolan 121, manufactured by Nippon Polyurethane Co., Ltd. (Japan) and 4.0 g of a polyester of trade name Bylon 200, manufactured by Toyobo Co., Ltd. (Japan) in 500 g of dichloromethane was applied onto a polyethylene terephthalate film having a thickness of 100 μm using an extrusion hopper, and it was dried at 130° C. for 20 min. The thickness of the thus-formed prime-coating layer was about 0.3 μm. The layer was allowed to stand at 50° C. for two days for curing. Thereafter a solution containing 3 g of cuprous iodide in 97 g of acetonitrile was applied onto the prime-coating layer in an amount of 0.3 g/m² in terms of dry weight, and it was dried at 100° C. The surface resistance of the thus-obtained transparent conductive film was $3.5 \times 10^4 \Omega/\square$.

EXAMPLE 13

Example 10 was repeated, except that instead of 4.0 g of Polyester Adhesive 49000, polymers shown in Table 5 were used. The surface resistances of the thus-obtained transparent conductive films are shown in Table 5. Their conductivities were good.

TABLE 5

| Polymer | | Surface resistance (Ω/□) |
|---|---|---|
| Polyester resin (Bylon 200, Toyobo Co., Ltd. | 4.0 g | $8.0 \times 10^3$ |

TABLE 5-continued

| Polymer | | Surface resistance ($\Omega/\square$) |
|---|---|---|
| (Japan)) | | |
| Vinyl acetate resin (MPR-T30, Nisshin Chemical Co., Ltd. (Japan)) | 4.0 g | $9.0 \times 10^3$ |
| Polycarbonate resin (K-1300, Teijin Chemical Co., Ltd. (Japan)) | 4.0 g | $9.0 \times 10^3$ |

EXAMPLE 14

A solution containing a polyisocyanate crosslinking agent of trade name Mirionate MR-100 manufactured by Nippon Polyurethane Co., Ltd. (Japan), in an amount of 5.0 g, an acryl polyol or an epoxy polyol in an amount shown in Table 6, and a polyester of trade name Bylon 200, manufactured by Toyobo Co., Ltd. (Japan), in an amount of 4.0 g in 500 g of methyl ethyl ketone was applied onto a polyethylene terephthalate film having a thickness of 100 μm using an extrusion hopper, and it was dried at 100° C. The thickness of the thus-formed prime-coating layer was about 0.2 μm. The film was allowed to stand at 50° C. for two days for curing. Thereafter a solution containing 3 g of cuprous iodide in 97 g of acetonitrile was applied onto the prime-coating layer in an amount of 0.3 g/m² in terms of dry weight, and it was dried at 100° C. The surface resistances of the thus-obtained transparent conductive films are shown in Table 6. They showed good conductivities.

TABLE 6

| | Polyol | | Surface resistance ($\Omega/\square$) |
|---|---|---|---|
| Acryl Polyol | Acdelic A-801 (Dai Nippon Ink & Chemicals, Inc.) | 0.4 g | $1.0 \times 10^4$ |
| | Acdelic A-804 (Dai Nippon Ink & Chemicals, Inc.) | 0.4 g | $1.2 \times 10^4$ |
| Epoxy Polyol | Epicote 1004 (Nippon Coating Co., Ltd.) | 0.2 g | $2.0 \times 10^4$ |
| | Epicote 1009 (Nippon Coating Co., Ltd.) | 0.2 g | $2.3 \times 10^4$ |

EXAMPLE 15

Example 14 was repeated, except that instead of polyols, polyamines shown in Table 7 were used. The surface resistances of the obtained transparent conductive films are shown in Table 7. They exhibited good conductivities.

TABLE 7

| Polyamine compound | | Surface resistance ($\Omega/\square$) |
|---|---|---|
| Rackamide N-153-IM-65 (manufactured by Dai Nippon Ink & Chemicals, Inc. (Japan)) | 2.0 g | $3.0 \times 10^4$ |
| Newpole NP-300 (manufactured by Sanyo Chemical Industries, Ltd. (Japan)) | 2.0 g | $3.8 \times 10^4$ |

EXAMPLE 16

A solution containing 4.0 g of a polyisocyanate of trade name Colonate L, manufactured by Nippon Polyurethane Co., Ltd. (Japan), and 3.0 g of a polyvinyl butyral (having a butyralation degree of 60%) in 93.0 g of dichloromethane was applied onto a polyethylene terephthalate film having a thickness of 100 μm using an extrusion hopper, and it was dried at 100° C. The thickness of the thus-formed prime-coating layer was about 0.3 μm. The layer was allowed to stand at 50° C. for two days for curing. Thereafter a solution containing 3 g of cuprous iodide in 97 g of acetonitrile was applied onto the prime-coating layer in an amount of 0.3 g/m² in terms of dry weight, and it was dried at 100° C. The surface resistance of the thus-obtained transparent conductive film was $9.0 \times 10^3 \Omega/\square$.

EXAMPLE 17

Example 16 was repeated, except that instead of 3.0 g of the polyvinyl butyral, polymers having functional groups reactive with isocyanate and solvents shown in Table 8 were used. The surface resistances of the thus-obtained transparent conductive films are shown in Table 8. They exhibited good conductivities.

TABLE 8

| Polymer | | Solvent | | Surface resistance ($\Omega/\square$) |
|---|---|---|---|---|
| Diacetyl cellulose (Daicel Co., Ltd. (Japan)) | 3.0 g | Acetone | 93 g | $1.2 \times 10^4$ |
| Nitrocellulose having a nitration degree of 11% (Daicel Co., Ltd. (Japan)) | 3.0 g | Acetone | 93 g | $1.5 \times 10^4$ |
| Polyamide CM-4000 (Toray Industries, Inc. (Japan)) | 3.0 g | Methanol | 93 g | $2.0 \times 10^4$ |
| Polyvinyl formal PVF-20 (Denki Kagaku Kogyo K.K. (Japan)) | 3.0 g | 1,2-Dichloroethane | 93 g | $1.5 \times 10^4$ |

EXAMPLE 18

A prime-coating layer about 0.5 μm in thickness was formed on a polyethylene terephthalate having a thickness of 100 μm in the same way as in Example 10. After the layer was allowed to stand at 50° C. for two days for curing, a solution containing 776 g of silver iodide and 2.14 g of potassium iodide in 2-butane was applied onto the film in an amount of 0.6 g/m² in terms of dry weight, and it was dried at 100° C. The resistance of the thus-obtained transparent conductive film was $2.5 \times 10^6 \Omega/\square$.

As is apparent from the results of Examples 10 to 18, the conductive films formed by using an isocyanate compound and a compound that causes curing by reacting with the isocyanate compound exhibit good conductivity in comparison with the Comparative Examples 1 to 3.

EXAMPLE 19

A solution containing 4.0 g of an epoxy resin of trade name EPON 1009, manufactured by Shell, and 1.0 g of triethylenetetramine in 250 g of dichloromethane was applied onto a polyethylene terephthalate film having a thickness of 100 μm using an extrusion hopper, and it was dried at 100° C. The thickness of the thus-obtained prime-coating layer was about 0.5 μm. The layer was allowed to stand for two days at 50° C. for curing. Thereafter a solution containing 3 g of cuprous iodide in 97 g of acetonitrile was applied onto the prime-coating layer in an amount of 0.3 g/m² in terms of dry weight, and it was dried at 100° C. The solution contained no binders, but was absorbed into the prime-coating layer to form a fine-particle layer of CuI, predominantly in the upper part of the prime-coating layer. The surface resistance of this transparent conductive film was measured using a Loresta MCP-TESTER at $1.5 \times 10^4 \Omega/\square$.

EXAMPLE 20

A solution containing 5.0 g of an epoxy resin of trade name Epicote-828, manufactured by Asahi Electro-Chemical Co., Ltd. (Japan), and 3.5 g of a modified aromatic polyamine of trade name EH-651, manufactured by the same company, in 350 g of dichloromethane was applied onto a polyethylene terephthalate film having a thickness of 100 $\mu$m using an extrusion hopper, and it was dried at 100° C. The film thickness of the thus-obtained prime-coating layer was about 0.5 $\mu$m. The layer was allowed to stand for one day at 50° C. for curing. Thereafter a solution containing 3 g of cuprous iodide in 97 g of acetonitrile was applied onto the prime-coating layer in an amount of 0.3 g/m$^2$ in terms of dry weight, and it was dried at 100° C. The surface resistance of the thus-obtained transparent conductive film was $1.0 \times 10^4 \Omega/\square$.

EXAMPLE 21

Example 20 was repeated, except that instead of 3.5 g of EH-651, 0.5 g of an amine complex compound of trade name Hardener HA 973, manufactured by Japan Ciba-Geigy Co., was used. The film thickness of the prime-coating layer was 0.3 $\mu$m. The surface resistance of the obtained transparent conductive film was $2.0 \times 10^4 \Omega/\square$.

EXAMPLE 22

A solution containing 3.0 g of an epoxy resin of trade name Epicote 100, manufactured by Nippon Coating Co., Ltd., (Japan), 3.0 g of an isocyanate crosslinking agent of trade name Colonate L, manufactured by Nippon Polyurethane Co., Ltd. (Japan), and 3.0 g of a polyester of trade name Bylon 200, manufactured by Toyobo Co., Ltd. (Japan), 300 g of methyl ethyl ketone was applied onto a polyethylene terephthalate film having a thickness of 100 $\mu$m using an extrusion hopper, and it was dried at 100° C. The thickness of the thus-obtained prime-coating layer was about 0.4 $\mu$m. The layer was allowed to stand for two days at 50° C. for curing. Thereafter the same procedure as in Example 20 was carried out onto the layer to form a conductive film. The surface resistance of the obtained transparent conductive film was $1.5 \times 10^4 \Omega/\square$. EXAMPLE 23

A prime-coating layer about 0.5 $\mu$m in thickness was formed on a polyethylene terephthalate film having a thickness of 100 $\mu$m in the same way as in Example 20. After the layer was allowed to stand at 50° C. for two days for curing, a solution containing 776 g of silver iodide and 2.14 g of potassium iodide in 2-butane was applied onto the layer in an amount of 0.6 g/m$^2$ in terms of dry weight, and it was dried at 100° C. The resistance of the thus-obtained transparent conductive film was $2.8 \times 10^6 \Omega/\square$.

As is apparent from the results of Examples 20 to 23, the conductive films formed by using an epoxy resin and a curing agent exhibit good conductivity compared with the Comparative Examples 1 to 3.

Having described our invention as related to the embodiment, it is our intention that the invention be not limited by any of the details of the description, unless otherwise specified, but rather be construed broadly within its spirit and scope as set out in the accompanying claims.

What we claim is:

1. A conductive film prepared by forming a prime-coating layer of a three-dimensional polymeric network structure on a base and by applying a semiconductive compound-containing solution onto the prime-coating layer to form a conductive layer, wherein the prime-coating layer is one of which degree of swelling $T_1/T_0$ is within the range of 1.05 to 2.5, wherein $T_0$ is the thickness of resin before immersion and $T_1$ is the thickness of resin after immersion into the solvent of the semiconductive compound solution for five minutes.

2. The conductive film as claimed in claim 1, wherein the base is selected from the groups consisting of polyesters, polyolefins, celluloses, polymethyl methacrylates, polyamides, polyimides, polycarbonates, polyvinyl alcohols, vinyl chloride-vinyl acetate copolymers, glass and papers coated with polyolefins or polyesters.

3. The conductive film as claimed in claim 1, wherein the prime-coating layer is one which does not substantially dissolve in a solvent of the semiconductive compound-containing solution, although it swells during application of the solution.

4. The conductive film as claimed in claim 1, wherein the prime-coating layer is one of which degree of swelling $T_1/T_0$ is within the range of 1.05 to 1.7, wherein $T_0$ is the thickness of resin before immersion, $T_1$ is the thickness of resin after immersion into the solvent of the semiconductive compound solution for five minutes.

5. The conductive film as claimed in claim 1, wherein the thickness of the prime-coating layer is in the range of 0.01 to 100 $\mu$m.

6. The conductive film as claimed in claim 1, wherein the semiconductive compound is present in the prime-coating layer near an opposite surface of a base at the highest concentration to form the conductive layer.

7. The conductive film as claimed in claim 1, wherein the amount of semiconductive compound applied is 40 to 2000 mg/m$^2$.

8. The conductive film as claimed in claim 1, wherein the semiconductive compound is selected from the group consisting of cuprous halide; silver halide; halides of bismuth, gold, indium, iridium, lead, nickel, palladium, rhenium, tin, tellurium and tungsten; cuprous thiocyanate, copper thiocyanate and silver thiocyanate; and mercury iodide.

9. The conductive film as claimed in claim 1, wherein the semiconductive compound is selected from the group consisting of cuprous iodide and silver iodide.

* * * * *